3,188,361
ISOMERIZATION PROCESS
John T. Cabbage, Bartlesville, Okla., assignor to Phillips Petroleum Company, a corporation of Delaware
Filed Apr. 30, 1962, Ser. No. 191,201
11 Claims. (Cl. 260—683.74)

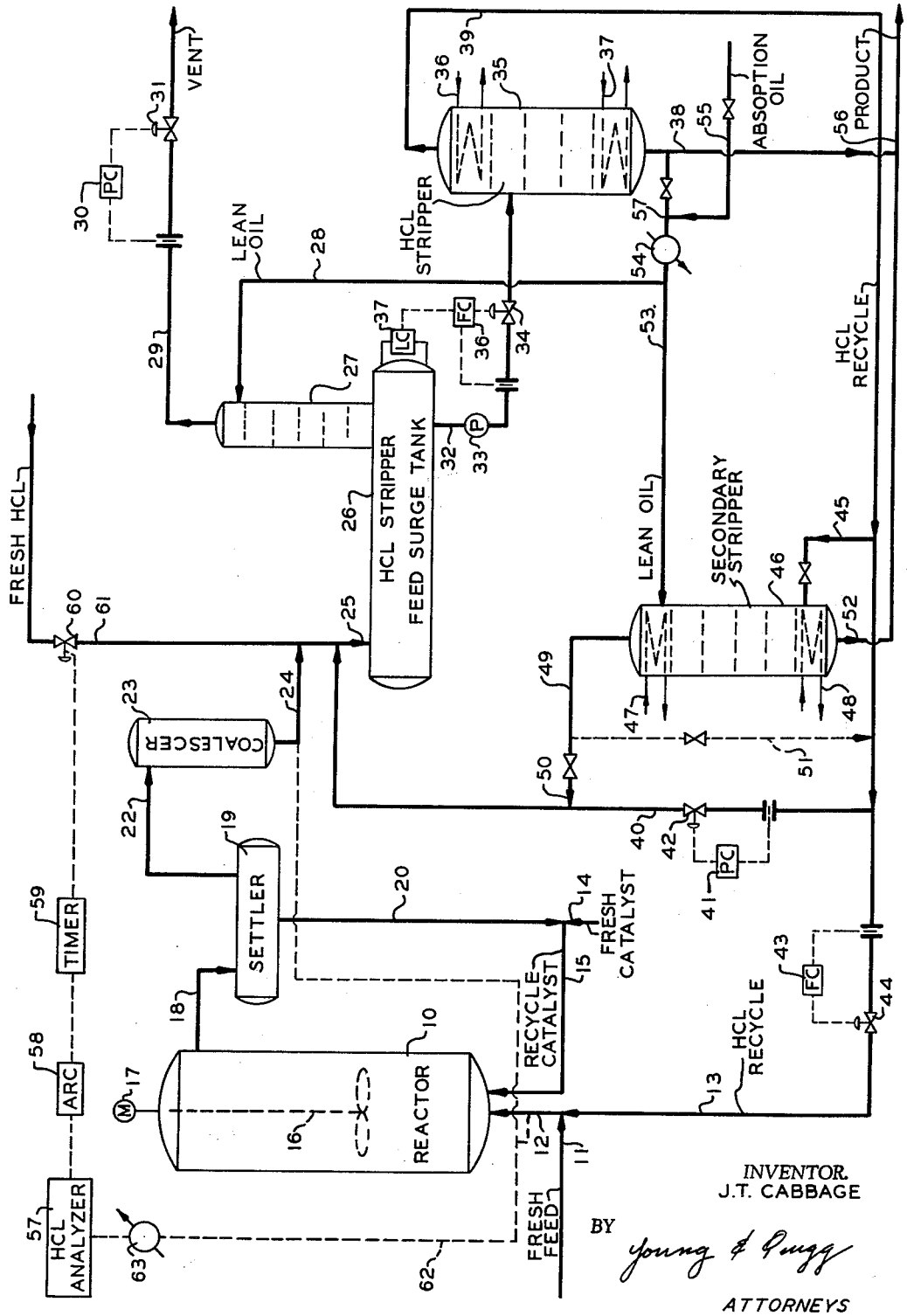

This invention relates broadly to an improved process and apparatus for the isomerization of hydrocarbons. In accordance with one aspect, this invention relates to an improved process and apparatus for the isomerization of hydrocarbons in the presence of a metal halide catalyst and hydrogen halide whereby light hydrocarbons are removed from the system with a decrease of hydrogen halide losses. In accordance with another aspect, this invention relates to an improved process and apparatus for controlling hydrogen halide concentration in the isomerization of hydrocarbons.

The isomerization of hydrocarbons in the presence of metal halide catalysts and hydrogen halide is well known. The isomerization of hexanes, for example, i.e., isomerizing normal hexane to isomeric hexanes and isomerizing methylcyclopentane to cyclohexane, using hydrogen halide, e.g., hydrogen chloride gas, as a promoter for a metal halide isomerization complex catalyst is preferably carried out in the liquid phase since the liquid phase equilibrium is more favorable than the vapor phase. Furthermore, a liquid-liquid contacting system is less complex than a liquid-vapor contacting system.

In the liquid phase catalytic isomerization of hydrocarbons, e.g., hexanes, inert non-condensing gases such as hydrogen, methane, ethane, propane, and butane are produced in the reaction. Furthermore, these inert materials are also present in the hydrocarbon feed charged to the isomerization process. It is often necessary to remove these gases from the system to keep them from pressuring up the unit. Also, the hydrogen halide promoter must be recovered and recycled back to the reaction zone because of economics.

Small quantities of the light gases mentioned above can accumulate in the isomerization system since they do not normally go out readily with the bottoms from the hydrogen halide stripper without excessive losses of hydrogen halide. This also entails a loss of caustic in the caustic washing step. The light gases must continuously be removed from the isomerization system to prevent over-pressuring, as noted above, or if the pressure is set, these gases must be removed so that the gases will not replace hydrogen halide in the hydrocarbon charge to the isomerization reactor which will ultimately reduce the hydrogen halide concentration to below a desired minimum, e.g., 4.0 weight percent, in the fresh feed to the reaction zone.

According to the present invention, the addition of hydrogen halide to the isomerization reaction is controlled in a novel manner and light hydrocarbon gases are continuously removed from the system by means of a secondary absorption or separation zone for treatment of the recycle hydrogen halide stream to minimize the loss of hydrogen halide from the system.

Accordingly, an object of this invention is to provide an improved process and apparatus for the isomerization of hydrocarbons.

Another object of this invention is to provide an improved process and apparatus for controlling the addition of hydrogen halide to an isomerization reaction.

A further object of this invention is to provide an improved process and apparatus enabling the removal of light hydrocarbons from the system with a decrease of hydrogen halide losses.

Other objects, aspects, as well as the several advantages of the invention will be apparent to those skilled in the art upon a further consideration of the specification, the drawing and the appended claims.

According to the invention, in the isomerization of hydrocarbons in the presence of a metal halide catalyst and a hydrogen halide and wherein hydrogen halide is ultimately recovered and recycled to the isomerization process, the present invention resides in the improvement which comprises measuring the hydrogen halide concentration of the reactant feed or effluent of the isomerization zone and controlling the addition of hydrogen halide to the system responsive to changes in the measured hydrogen halide concentration, and continuously subjecting a portion of the hydrogen halide recycle stream to absorption to remove light hydrocarbons therefrom and return hydrogen halide reduced in light hydrocarbon content to the system for further use. By the practice of the present invention, light hydrocarbons are continuously removed from the system at a higher rate than normally possible, thus reducing the loss of hydrogen halide normally encountered in current plant practice.

In the usual isomerization reaction, hydrocarbon reactants are contacted in a reaction zone with metal halide catalyst in the presence of hydrogen halide and under suitable conditions to effect the isomerization reaction. Effluent from the reaction is passed to a settler wherein separation of the major proportion of the catalyst is effected, the catalyst normally being recycled to the reactor. The hydrocarbon portion of the reaction effluent is then further processed to remove residual catalyst after which it is introduced to a surge vessel, which serves as a feed tank for a hydrogen halide stripper, wherein hydrogen halide and lighter materials are separated from the effluent. The bottoms product from the hydrogen halide stripper comprises the desired isomerizate which can be processed further, for example, by separation into additional fractions. The overhead from the hydrogen halide stripper comprises lighter hydrocarbons, non-condensable gases, etc. and hydrogen halide. This stream is normally recycled to the reaction zone to provide reuse of the hydrogen halide contained therein.

Inasmuch as non-condensables tend to accumulate in the system, provision is ordinarily made to periodically vent these materials from an appropriate point in the system, for example, from the surge zone containing the feed to the hydrogen halide stripping zone. In order to remove the heavier gases by the vent system, either excessive quantities of hydrogen halide must be vented or the heavier gases will build up in the stripper and in the recycle hydrogen halide stream until these materials cause upset conditions on the hydrogen halide stripper which allow these heavier components to be removed from the bottom of the stripper along with excessive hydrogen halide.

According to the invention, a relatively small portion or sidestream is removed from the recycled hydrogen halide stream and passed to a secondary absorption zone wherein the hydrogen halide-containing stream is contacted with an absorption medium, preferably a portion of the isomerizate product, to remove hydrocarbon components therefrom. According to the present invention, ethane and heavier materials are removed from the hydrogen halide stream by the absorption medium and the enriched absorption medium can then be combined with the isomerizate product for further processing. Thus, according to the invention, ethane and heavier materials are removed from the system without upsetting the system and without excess hydrogen halide loss. The hydrogen halide stream subjected to absorption conditions denuded in hydrocarbon content can be passed to the surge tank for further processing or recycled to the isomerization zone.

Also, according to the invention, fresh hydrogen halide addition to the isomerization process is controlled responsive to a measured hydrogen halide concentration of the isomerization zone reactant feed or effluent to replace hydrogen halide which is lost from the system in the vent gases and from other causes, for example, leaks from process equipment. The control system of the invention for regulating hydrogen halide addition permits operation of the system with a minimum of pressure drop by increasing the pressure on the stripper on the surge tank and decreasing the pressure on the hydrogen halide stripper, both of which are desirable features because of reduced hydrogen halide losses and utility requirements. Thus, the improved control system of the invention can be practiced on a conventional isomerization process such as discussed above without the feature of the invention of subjecting a portion of the hydrogen halide recycle to absorption. However, the preferred system comprises both the secondary absorption zone for treating a portion of the recycle hydrogen halide stream and the control system for regulating hydrogen halide addition to the process.

A better understanding of the invention will be obtained upon reference to the accompanying drawing which is a diagrammatic illustration of an isomerization unit including an instrumentation system according to the invention and a secondary stripping or absorption zone for treatment of a portion of the hydrogen halide recycle stream.

The following discussion will be directed primarily to the isomerization of a feed mixture comprising normal hexane and methylcyclopentane in the presence of aluminum chloride and hydrogen chloride. This is not intended, however, in any limiting sense and it is within the scope of the invention to isomerize hydrocarbons, in general, using catalysts selected from those hereinbelow set forth.

Referring now to the drawing, a feed material comprising a mixture of normal hexane, methylcyclopentane and containing some cyclohexane and isohexanes is introduced to reactor 10 through conduits 11 and 12. Prior to entering the reactor, the feed is combined with recycle gases containing hydrogen chloride through conduit 13. Aluminum chloride catalyst (fresh and recycle) is introduced into reactor 10 through conduit 15. The principal reaction which takes place in reactor 10 is the isomerization of normal hexane to aliphatic isohexanes (2-methylpentane, 3-methylpentane, 2,2-dimethylbutane and 2,3-dimethylbutane) and methylcyclopentane to cyclohexane. During the course of the reaction, the contents of the reactor are maintained in an agitated state by stirrer 16 which is driven by a motor 17.

The isomerization of normal acyclic and alkyl-substituted alicyclic hydrocarbons, such as normal hexane and methylcyclopentane, is carried out usually at a temperature in the range of about 90 to about 160° F. The reaction is preferably effected under sufficient pressure to provide a liquid phase reaction, namely, a pressure in the range of between about 120 and about 300 p.s.i.g. The contact or residence time of the reactants in the reaction zone varies but is usually between about 0.1 and about 5 hours. In addition to the catalyst, it is desirable that the corresponding hydrogen halide be present in the reaction zone since this material maintains catalyst activity at a high level. The amount of hydrogen chloride present is usually between about 2 to about 6 percent by weight based on the hydrocarbon reactant with about 4 percent by weight being preferred. The hydrocarbon-to-catalyst ratio is also an important factor in isomerization reaction and this ratio is generally maintained between about 1.1:1 and about 1.4:1, although ratios as high as 5:1 can be used if reaction temperatures are increased.

Effluent from reactor 10 comprising unreacted normal hexane, methylcyclopentane, cyclohexane and the various isohexanes is passed through conduit 18 and enters settler 19 wherein entrained catalyst is separated from the hydrocarbon material, the major portion of the settled catalyst being returned to the reactor through conduits 20 and 15. Fresh catalyst can be added to the system through conduit 14 and introduced into line 15 along with recycle catalyst.

Although a substantial separation of catalyst and hydrocarbon is effected in settler 19, the hydrocarbon effluent therefrom still contains solution aluminum chloride, some entrained complex, and a major proportion of the hydrogen chloride. This stream is preferably passed through conduit 22 into coalescer 23 for the purpose of effecting removal and recovery of entrained complex catalyst. Various inert materials can be used for coalescing the catalyst, including sand, charcoal and the like, however, bauxite is preferred for this purpose.

The effluent from the coalescer being substantially free of entrained complex but containing solution aluminum chloride and HCl is introduced to hydrogen chloride stripper feed surge tank 26 through conduits 24 and 25. To minimize build up of light gaseous hydrocarbons in the system, venting of gases is provided through vent gas absorber 27 which is disposed on the stripper feed surge tank 26. In order to minimize loss of hydrogen chloride in this operation, the vent gas absorber is refluxed through conduit 28, preferably with bottoms from the hydrogen chloride stripper. A portion of the hydrogen chloride is thus absorbed and returned to the stripper feed surge tank with the gases being removed from the system through conduit 29. The flow of vent gases through conduit 29 is controlled by pressure controller 30 and flow control valve 31 associated therewith.

Accumulated material in the feed surge tank is removed therefrom through conduit 32, pump 33, motor valve 34, and introduced into hydrogen chloride stripper 35 wherein the major proportion of the hydrogen chloride is separated overhead from the reactor effluent. Flow controller 36 is reset by liquid level controller 37 so as to regulate the withdrawal of accumulated material from surge tank 26. Stripper 35 is provided with a condenser coil 36 in the upper portion of the vessel and a heating coil 37 in the lower portion of the vessel. Stripper 35 bottoms product comprising principally the heavier hydrocarbon portion of the reactor effluent is removed therefrom through conduit 38 and yielded from the unit. As desired, the bottoms isomerizate product can be subjected to further processing to separate the various components thereof. The overhead removed from stripper 35 comprising hydrogen chloride and hydrocarbon gases is returned to the isomerization reactor through conduits 39 and 13. Any excess of the hydrogen chloride-containing recycle gas is returned through conduit 40 and 25 to the hydrogen chloride stripper feed surge tank 26. The flow of hydrogen chloride recycle returned to the surge tank is controlled by pressure controller 41 and flow control valve 42 connected thereto. The flow of hydrogen chloride recycle to reactor 10 is controlled by flow controller 43 and connecting control valve 44.

According to the invention, a portion of the hydrogen chloride recycle in conduit 39 is passed by way of conduit 45 to a secondary stripper or absorption zone 46. In stripper 46, the hydrogen chloride recycle stream which also contains hydrocarbon gases is countercurrently contacted with a lean absorption oil introduced by way of conduit 53 into an upper portion of stripper 46. Stripper 46 is provided with a condensing coil 47 in the upper portion thereof and a heating coil 48 in the lower portion thereof. The hydrogen chloride-containing recycle stream contacted in stripper 46 is contacted under conditions such that a substantial portion of the hydrocarbon gases present therein are removed along with the absorption oil from the bottom of stripper 46 by way of conduit 52, and then combined with the isomerizate product removed from stripper 35 by way of conduit 38. Overhead withdrawn from stripper 46 enriched in hydrogen chloride content is removed by lines 49 and 50 and returned to feed surge tank 26. If desired, the hydrogen chloride stream removed overhead by conduit 49 can be passed by way of valved line 51 back to recycle line 39 and passed to reactor 10 by way of line 13.

The absorption medium employed in stripper 46 can be any known absorption oil which will remove the hydrocarbon gases from the HCl-containing stream. The absorption oil can be introduced by way of valved conduit 55, cooler 54 and conduit 53 and introduced into an upper portion of stripper 46. Preferably, the absorption medium is the bottoms isomerizate product removed from stripper 35 which is passed by way of lines 57, cooler 54 and line 53 into stripper 46. By utilizing stripper 46 according to the invention, the present process removes ethane and heavier hydrocarbons from the system without upsetting the entire process and without excess hydrogen chloride loss.

Also, according to the invention, an instrumentation system is provided in conjunction with the isomerization system and stripper-absorber hereinbefore described which comprises a hydrogen chloride analyzer 57 which measures the hydrogen chloride content of the coalescer effluent in conduit 24, or feed in conduit 12. A small stream of coalescer, hydrocarbon effluent or reactant feed is passed by way of conduit 62 to vaporizer 63 and introduced into HCl analyzer 57. Associated with hydrogen chloride analyzer 57 is an analyzer recorder controller 58 which is adapted to receive a signal from analyzer 57 proportional to the hydrogen chloride content of the stream analyzed, a timer 59 and a control valve 60 in fresh hydrogen chloride conduit 61. Control valve 60 is spring loaded closed and a signal from the analyzing recording controller 58 and timer 59 opens valve 60 for HCl gas injection into the system by way of conduit 61. Timer 59 has a total period of, for example, five minutes with the signal allowed to pass to valve 60 for only, for example, 0.5 minute in each 5 minute cycle. Thus, if analyzers 57 and 58 do not call for HCl, the valve 60 will remain closed. In analyzers 57 and 58 call for HCl addition, valve 60 will open for 0.5 minute of each 5 minute cycle.

Hydrogen chloride analyzer 57 measures the concentration of hydrogen chloride in the coalescer effluent in conduit 24 or feed conduit 12 and transmits a signal proportional to said concentration to analyzer recorder controler 58. This instrument, in turn, passes a signal to timer 59 which periodically passes the signal to valve 60 to open same when HCl addition is demanded by the analyzer. If, for example, the percentage of hydrogen chloride in the effluent or feed decreases, analyzer 57 and 58 transmits signals to timer 59 to open valve 60 and allow introduction of HCl. The signals referred to above can be either electrical or pneumatic. With this automatic control system, flow controller 43 and valve 44 are not used.

The preceding discussion has been directed to a preferred embodiment of the invention; however, it is within the scope of the invention to employ other process arrangements and instrumentation within the scope of the invention. Any conventional instruments known to those skilled in the art can be employed in carrying out the invention. Thus, conventional flow recorder controllers, orifices, control valves, timer, etc. can be employed in the various locations in the process flow wherein they are called for. The hydrogen choride analyzer can be a conventional analyzer, for example, a Davis Continuous Electroconductivity Analyzer, manufactured by Davis Instruments, a division of Davis Emergency Equipment Company, Inc.

The process of this invention is applicable in general to the conversion of hydrocarbons by isomerization. A wide variety of hydrocarbons can be converted in the isomerization reaction, for example, straight chain paraffins, such as butane, pentane, hexane, heptane and higher molecular weight compounds can be converted to various isomers. Also, moderately branch paraffins can be converted to more highly branched materials, thus, 2-methylpentane can be isomerized to 2,2-dimethylbutane. It is also possible to isomerize naphthenic hydrocarbons having 5, 6, 7 and more carbon atoms in the rings. Examples includes the isomerization of methylcyclopentane to cyclohexane, 1,1-dimethyl cyclobutane to methylcyclopentane, 2-dimethlcyclopentane to methylcyclohexane, and the like. The isomerization reaction is usually carried out at a temperature between above 25° C. and 100° C. and pressures from one atmosphere to 300 p.s.i., or higher.

The catalysts employed in carrying out isomerization comprise metal halides such as aluminum chloride, aluminum bromide, boron trifluoride and the halides of metals, such as zinc, tin, arsenic, antimony, zirconium, beryllium, titanium, iron and the like. The catalysts are especially effective when present as complexes which are formed by interaction between the metal halides and hydrocarbons present in the reaction system. A particularly desirable reaction catalyst is the complex of hydrocarbons with aluminum chloride.

A better understanding of the invention will be obtained upon reference to the following illustrative example which is not intended, however, to unduly limit the invention.

SPECIFIC EXAMPLE

This example will be described in connection with the drawing wherein the same numerals will be used in the example as shown for the streams and equipment in the drawing.

*Operating conditions*

Surge tank 26:
    Pressure, p.s.i.a. _____ 155
    Temperature, ° F. _____ 140
Vent gas effluent 29:
    Pressure, p.s.i.a. _____ 154
    Temperature, ° F. _____ 100
HCl stripper 35:
    Bottom temperature, ° F. _____ 370
    Top temperature, ° F. _____ 100
    Pressure, p.s.i.a. _____ 205
Secondary stripper 46:
    Bottom temperature, ° F. _____ 310
    Top temperature, ° F. _____ 100
    Pressure, p.s.i.a. _____ 200

*Flows*

Lean oil to surge 28:
    Quantity, b./d. _____ 350
    Temperature, ° F. _____ 90
Lean oil to secondary stripper 53:
    Quantity, b./d. _____ 30
    Temperature, 0 F. _____ 90
Product to caustic wash 56:
    Quantity, b./d. _____ 5600

The compositions and flows for the various streams shown in the drawing according to the invention are set forth in the table. The values set forth are mols/day. Catalyst contents are not shown in Tables I and II.

TABLE I

| Stream | 11 | 13 | 12 | 22 | 61 | 29 | 25 | 28 | 32 | 38 | 39 | 45 | 49 | 52 | 56 |
|---|---|---|---|---|---|---|---|---|---|---|---|---|---|---|---|
| $H_2$ | 25.0 | 22.8 | 47.8 | 82.8 | | 60.0 | 82.8 | | 22.8 | | 22.8 | 2.4 | 2.4 | | |
| $C_1$ | 1.0 | 68.6 | 69.6 | 74.6 | | 6.0 | 74.6 | | 68.6 | | 68.6 | 7.2 | 7.2 | | |
| HCl | | 1,521.2 | 1,521.2 | 1,521.2 | 7.0 | 6.2 | 1,528.2 | | 1,522.0 | | 1,522.0 | 160.0 | 159.2 | 0.8 | 0.8 |
| $C_2$ | 0.2 | 163.8 | 164.0 | 169.8 | | 6.0 | 169.8 | | 163.8 | | 163.8 | 17.2 | 17.2 | | |
| $C_3$ | 0.7 | 31.1 | 31.8 | 36.2 | | 2.1 | 36.2 | | 34.1 | | 34.1 | 3.6 | 0.6 | 3.0 | 3.0 |
| $C_4$'s | 5.4 | 29.0 | 34.4 | 34.4 | | 2.0 | 34.4 | | 32.4 | | 32.4 | 3.4 | | 3.4 | 3.4 |
| $C_5$'s | 0.2 | 3.4 | 3.6 | 8.4 | | 4.6 | 8.4 | | 3.8 | | 3.8 | 0.4 | | 0.4 | 0.4 |
| $C_6$'s | 16,286.0 | 55.4 | 16,341.4 | 16,325.9 | | 2.7 | 16,325.9 | 1,020.0 | 17,343.2 | 17,287.9 | 55.3 | 5.8 | 5.9 | 217.9 | 16,267.8 |
| | 16,318.5 | 1,895.3 | 18,213.8 | 18,253.3 | 7.0 | 89.6 | 18,260.3 | 1,020.0 | 19,290.7 | 17,287.9 | 1,902.8 | 200.0 | 192.5 | 225.5 | 16,275.4 |

For comparative purposes, the compositions and flows for a conventional process without the secondary stripper of the invention are set forth in Table II.

TABLE II

| Stream | 11 | 13 | 12 | 22 | 61 | 29 | 25 | 28 | 32 | 38 | 56 |
|---|---|---|---|---|---|---|---|---|---|---|---|
| $H_2$ | 25.0 | 22.8 | 47.8 | 82.8 | | 60.0 | 82.8 | | 22.8 | | |
| $C_1$ | 1.0 | 68.6 | 69.6 | 74.6 | | 6.0 | 74.6 | | 68.6 | | |
| HCl | | 1,522.0 | 1,522.0 | 1,522.0 | 10.0 | 10.0 | 1,532.0 | | 1,522.0 | | |
| $C_2$ | 0.2 | 163.8 | 164.0 | 169.8 | | 6.0 | 169.8 | | 163.8 | | |
| $C_3$ | 0.7 | 34.3 | 35.0 | 39.4 | | 5.1 | 39.4 | | 34.3 | | |
| $C_4$'s | 5.4 | 32.4 | 37.8 | 37.8 | | 5.4 | 37.8 | | 32.4 | | |
| $C_5$'s | 0.2 | 3.8 | 4.0 | 8.8 | | 5.0 | 8.8 | | 3.8 | | |
| $C_6$'s | 16,286.0 | 55.3 | 16,341.3 | 16,325.8 | | 2.5 | 16,325.8 | 1,020.0 | 17,343.3 | 17,288.0 | 16,268.0 |
| | 16,318.5 | 1,903.0 | 18,221.5 | 18,261.0 | 10.0 | 100.0 | 18,271.0 | 1,020.0 | 19,191.0 | 17,288.0 | 16,268.0 |

It can be seen from the above tables that the loss of HCl according to conventional practice is considerably higher than according to the invention, i.e., 10 mols/day loss versus 7.0 mols/day loss. The decrease in loss of HCl according to the invention represents a savings of about $7000/year.

As will be apparent to those skilled in the art, various modifications can be made in the invention without departing from the spirit or scope thereof.

I claim:

1. In a process for the isomerization of hydrocarbons with a metal halide catalyst and hydrogen halide, in which the isomerization reaction effluent is introduced to a surge absorption zone from which non-condensable gases, including hydrogen halide and lighter materials, are vented, material from said surge absorption zone is introduced to a stripping zone wherein a gaseous material rich in hydrogen halide is separated, said gaseous material is recycled to the isomerization reaction and fresh hydrogen halide is introduced to the process as makeup, the improvement which comprises passing a portion of said gaseous recycle to a reboiled absorption zone to separate light hydrocarbon gases therefrom by contacting with a liquid absorption medium, removing said light hydrocarbon gases from said reboiled absorption zone and from the system, and returning a stream concentrated in hydrogen halide from said reboiled absorption zone to the system, the reboiled absorption zone serving to remove light hydrocarbons heavier than hydrogen halide from the system with a resultant decrease in the loss of hydrogen halide.

2. In a process of rthe isomerization of hydrocarbons with a metal halide catalyst and hydrogen halide, in which the isomerization reaction effluent is introduced to a surge absorption zone from which non-condensable gases, including hydrogen halide and lighter materials, are vented, material from said surge absorption zone is introduced to a stripping zone wherein a gaseous material rich in hydrogen halide is separated, said gaseous material is recycled to the isomerization reaction and fresh hydrogen halide is introduced to the process as makeup, the improvement which comprises passing a portion of said gaseous recycle to a reboiled absorption zone and therein countercurrently contacting same with a liquid absorption medium to separate light hydrocarbon gases therefrom, removing enriched absorption medium from said reboiled absorption zone and from the system, and returning the overhead concentrated in hydrogen halide from the reboiled absorption zone to said surge absorption zone, the reboiled absorption zone serving to remove light hydrocarbons heavier than said hydrogen halide from the system with a resultant decrease in the loss of hydrogen halide.

3. The process of claim 2 wherein the absorption medium employed in said reboiled absorption zone is a portion of the isomerization product of the process and wherein the enriched absorption medium removed from said reboiled absorption zone is combined with the isomerization product and passed to further processing.

4. The process of claim 2 in which the hydrocarbon reactant feed comprises normal hexane, methylcyclopentane, the catalyst is aluminum chloride and the hydrogen halide is HCl.

5. The process of claim 2 including the steps of measuring the hydrogen halide concentration in the feed comprising hydrocarbon and recycle hydrogen halide passed to said isomerization, and controlling the addition of fresh hydrogen halide to the system responsive to the measured hydrogen halide concentration in the feed.

6. In an apparatus, comprising, in combination, a reactor adapted for the isomerization of hydrocarbons with a metal halide catalyst and a hydrogen halide, conduit means for introducing hydrocarbon feed, metal halide catalyst and hydrogen halide to said reactor, a surge vessel, conduit means for transferring reaction effluent from said reactor to said surge vessel, conduit means for introducing fresh hydrogen halide to said surge vessel, conduit means for venting gases from said surge vessel through a first absorption vessel, a hydrogen halide stripper, conduit means for transferring liquid from said surge vessel to said stripper, conduit means for removing liquid product from said stripper, conduit means for removing vapor product rich in hydrogen salide from said stripper, conduit means for recycling said vapor product from said stripper to said reactor, the improvement which comprises a second absorption vessel having means for reboiling, conduit means for transferring a portion of said recycled vapor product to said second absorption vessel, conduit means for introducing an absorption medium into said second absorption vessel, conduit means for removing rich absorption medium as bottoms from said absorption vessel, conduit means for removing overhead from said absorption vessel and passing same to said surge vessel, first instrumentation means connected to said reactor feed conduit means for measuring the concentration of hydrogen halide in the feed to said reactor, and additional instrumentation means associated with said first instrumentation means connected to a control valve in said conduit for introducing hydrogen halide to said surge vessel adapted to vary the quantity of fresh hydrogen halide introduced into the system responsive to changes in the measured hydrogen halide concentration.

7. The apparatus of claim 6 in which the conduit means for introducing adsorption medium is connected to the conduit means for removing liquid product from said stripper so that a portion of the product is used as the absorption medium, and the conduit for removing rich absorption medium is connected to said conduit means for removing liquid product from said stripper so that the rich absorption medium can be combined with the liquid product for further treatment.

8. The apparatus of claim 6 in which said instrumentation means comprises a hydrogen halide analyzer, an analyzer recorder controller, and a timer connected together, and the control valve for introducing fresh hydrogen halide into said surge vessel is normally closed and the timer periodically passes a signal to said closed valve to open same when hydrogen halide addition is called for by the hydrogen halide analyzer.

9. The apparatus of claim 6 wherein said instrumentation means is connected to said conduit means connecting said reactor and said surge vessel and measures the concentration of hydrogen halide in the reactor effluent and wherein said instrumentation means comprises a hydrogen halide analyzer, an analyzer recorder controller, and a timer connected together, and the control valve for introducing fresh hydrogen halide into said surge vessel is normally closed and the timer periodically passes a signal to said closed valve to open same when hydrogen halide addition is called for by the hydrogen halide analyzer.

10. The process of claim 2 including the steps of measuring the hydrogen halide concentration in the reactor effluent comprising hydrocarbon and hydrogen halide removed from said isomerization, and controlling the addition of fresh hydrogen halide to the system responsive to the measured hydrogen halide concentration in the reactor effluent.

11. A process for isomerizing hexanes to isomeric hexanes which comprises:
contacting a hexane-containing feed with an aluminum chloride catalyst in the presence of hydrogen chloride under conditions such that isomerization takes place,
passing the isomerization effluent to a phase separation zone and therein effecting separation of said effluent into a hydrocarbon phase and recycling said catalyst phase to said contacting, recovering said hydrocarbon phase from said separation zone and passing same through a coalescing zone to remove entrained catalyst and then to a surge-absorption zone from which non-condensable gases, including hydrocarbon chloride and lighter materials, are vented, said vented gases being countercurrently contacted with a portion of the isomerizate product as the absorption medium prior to venting to minimize the loss of hydrogen chloride from the system by returning same along with absorption medium to the surge zone,
withdrawing a liquid phase containing hydrocarbons and hydrogen chloride from said surge-absorption zone and passing same to a reboiled stripping zone wherein a gaseous stream rich in hydrogen chloride is separated overhead and liquid isomerizate product separated as bottoms,
recycling a portion of said gaseous stream directly to said contacting,
passing the remainder of said gaseous stream to a reboiled absorptive zone and therein countercurrently contacting same with a portion of said isomerizate product as the absorption medium to effect removal of hydrocarbons heavier than hydrogen chloride from said gaseous stream contacted in said reboiled absorption zone and removing enriched absorption medium from said reboiled absorption zone and the system,
recovering overhead from said reboiled absorption zone a gaseous stream enriched in hydrogen chloride content and returning same to the system for reuse in the process,
measuring the hydrogen chloride concentration in said hydrocarbon phase recovered from said effluent, and
controlling the addition of makeup hydrogen chloride to said surge-absorption zone responsive to changes in said measured hydrogen chloride concentration.

References Cited by the Examiner
UNITED STATES PATENTS

| | | | |
|---|---|---|---|
| 2,392,047 | 1/46 | Kassel | 260—683.7 |
| 2,408,950 | 10/46 | Pines et al. | 260—683.7 |
| 2,416,467 | 2/47 | Carney | 260—683.74 |
| 2,929,682 | 3/60 | Clark | 260—683.74 |
| 2,983,774 | 5/61 | Thompson | 260—683.74 |

FOREIGN PATENTS

| | | |
|---|---|---|
| 505,221 | 8/54 | Canada. |

ALPHONSO D. SULLIVAN, *Primary Examiner.*